United States Patent [19]

Locker et al.

[11] Patent Number: 5,628,465
[45] Date of Patent: May 13, 1997

[54] GRANULATING DEVICE FOR STRAND MATERIALS

[75] Inventors: Peter Locker; Walter Pirrung, both of Grossostheim, Germany

[73] Assignee: Rieter Automatik GmbH, Germany

[21] Appl. No.: 407,706

[22] Filed: Mar. 21, 1995

[30] Foreign Application Priority Data

Mar. 30, 1994 [DE] Germany ............................ 44 11 165.7
Dec. 28, 1994 [DE] Germany ............................ 44 46 989.6

[51] Int. Cl.$^6$ .................. B02C 18/06; B02C 23/04
[52] U.S. Cl. ............................... 241/34; 241/37.5
[58] Field of Search ................... 241/37.5, 34; 83/58, 83/436, DIG. 1

[56] References Cited

U.S. PATENT DOCUMENTS

| 3,897,016 | 7/1975 | Shah ............................................ 241/73 |
| 4,037,712 | 7/1977 | Wochnowski ................................ 198/524 |
| 4,842,205 | 6/1989 | Araki et al. ................................... 241/34 |

FOREIGN PATENT DOCUMENTS

| 0013575 | 1/1979 | European Pat. Off. . |
| 0615785 | 9/1994 | European Pat. Off. . |
| 646 199 | 5/1937 | Germany . |
| 2460484 | 7/1976 | Germany . |
| 2821591 | 11/1979 | Germany . |
| 29 01 018 C2 | 7/1980 | Germany . |
| 42 35 161 | 5/1993 | Germany . |
| 6000405 | 1/1994 | Japan ................................. 241/37.5 |
| 191582 | 12/1937 | Switzerland ............................. 83/58 |

OTHER PUBLICATIONS

Patent Abstracts of Japan, vol. 13, No. 334 (M–855) Jul. 27, 1989.

*Primary Examiner*—John M. Husar
*Attorney, Agent, or Firm*—Banner & Witcoff, Ltd.

[57] ABSTRACT

The invention relates to a granulating device for strand materials comprising a pull-in device for feeding the strand material, conducted through an inlet shaft, and transporting it to a knife roll for cutting up the strand material into granulate, said pull-in device having a pull-in roll, and a counter-roll, of which rolls at least one is driveable and both form a inter-roll gap for pulling-in the strand material. A proximity-type switching element is disposed in the region of the inlet shaft, particularly in front of the entrance thereof, said proximity-type switching element raising, when actuated, the setting of the inter-roll gap and increasing the inter-roll gap to such a width that the further pulling-in of the strand material is abruptly stopped.

12 Claims, 10 Drawing Sheets

GRANULATING DEVICE FOR STRAND MATERIALS

DESCRIPTION

The invention relates to a granulating device for strand materials with a pull-in device for feeding the strand material, conducted through an inlet shaft, and transporting it to a knife roll for cutting up the strand material into granulate and with a pull-in roll, contained in the pull-in device, and a counter-roll, of which rolls at least one is driveable and both form a inter-roll gap for pulling in the strand material.

Such a granulating device is described in DE-PS 29 01 018. In said granulating device, the pull-in device consists of an upper roll and a lower roll, it being possible for the support of the bearings of the upper roll towards the lower roll to be set to fixed values of the gap formed by the two rolls.

In such a granulating device, it must be ensured that the operating personnel cannot be endangered during operation. Various measures have already been proposed for this purpose in conjunction with rolls arrangements consisting of two rolls. According to DE-PS 646199, the hazardous area in conjunction with roll and tear mills is subjected to an alternating electromagnetic field, said alternating field, while personnel is present in the hazardous area, being supplied to a receiving device connected to an alarm apparatus and/or a switching mechanism for shutting down the machine. A similar arrangement is disclosed in DE-OS 42 35 161, wherein a field of electric waves is directed to a hazardous area in front of a rolls arrangement, said field of electric waves triggering a sensor when an operator enters said field, said sensor generating a signal, in particular for switching off the machine.

SUMMARY OF THE INVENTION

The object of the invention is to ensure that an operator who approaches a hazardous area of the above-mentioned granulating device does not penetrate the actual hazardous area, e.g. with his/her hand. The object of the invention is achieved in that a proximity-type switching element is disposed in the region of the inlet shaft, particularly in front of the orifice thereof, said proximity-type switching element cancelling or raising, when actuated, the setting of the inter-roll gap and increasing the inter-roll gap to such a width that the further pull-in of the strand material is abruptly stopped.

Through the proximity-type switching element and its actuation, e.g. by a hand of an operator displacing the proximity-type switching element, it is ensured—through the resultant increase of the inter-roll gap, with cancelling the tension acting on the strand material and the thereby caused immediate stopping of the further pulling-in of the strand material—that the strand material, owing to it immediately being stopped, is unable to exert any friction on a hand, particularly if the hand is wound up, with the result that it is safely guaranteed that the hand cannot be injured by being pulled into the interior of the inlet shaft. Furthermore, this manner of preventing the hand of an operator from being entrained results in that it is possible for the granulating device itself to be allowed to continue to operate without endangering the operator, the rapid stoppage of the granulating device—as proposed in the prior art—usually being difficult or even impossible for the reason that the rolls to be stopped and their driving elements are of a quite considerable mass. Apart from this, the particularly rapid stoppage of such rolls may also result in damage thereof. The unimpeded continued operation of the machine, made possible by the solution according to the invention, therefore does not give rise to any problems whatsoever in the actual machine environment, it being ensured, however, through the abrupt increase of the inter-roll gap, that the further pulling-in of the strand material can be stopped correspondigly fast and without any problems. The increasing of the inter-roll gap is an advantageous measure to the extent that it does not involve any movements over long distances, since the mere lifting-off of one of the rolls from the strand material removes contact with the strand material, the pulling-in of the strand material thereby being stopped from then on.

Conveniently, the device is so designed that the proximity-type switching element is in communication with the inlet shaft, said inlet shaft determining a safety clearance between the pull-in device and the proximity-type switching element. The inlet shaft thus either forms a support for the proximity-type switching element; alternatively, however, it is also possible for the inlet shaft itself to be formed as a proximity-type switching element. A further possible design of the proximity-type switching element consists in that the proximity-type switching element is in the form of a frame, said frame essentially embracing the inlet shaft and being displaceable in the switching direction of the shaft, said frame, for example, being displaceable by the hand of an operator and thereby then causing the inter-roll gap to be increased.

An advantageous design option for the interaction between proximity-type switching element and the rolls consists in providing the pull-in device with a displaceable pull-in roll, said pull-in roll being held in displacement bearings which permit the parallel displacement of said pull-in roll, wherein the displacement bearings are pressed against a stop by a preload, said preload being triggerable by the proximity-type switching element in such a manner that, when the proximity-type switching element is actuated, the preload is removed and a counterforce takes effect, said counterforce lifting the displacement bearings from the stop and thus the displaceable pull-in roll from the counter-roll. The interaction between the preload, acting on the displacement bearings, and the shutdown when the proximity-type switching element is actuated results in the counterforce taking effect abruptly, this then allowing the displaceable pull-in roll to lift off abruptly from the counter-roll.

An advantageous design of the displacement bearings can be achieved in that the displacement bearings are in the form of rockers, a piston-cylinder unit controllable by the proximity-type switching element acting on each of said rockers.

The embodiment of the displacement bearings in the form of rockers represents a simple design for the required displacement of the relevant pull-in roll, it being possible to dispense with otherwise necessary, more complex slide-type guides. In this connection, it should also be pointed out that the preload applied by the controllable piston-cylinder unit can also be generated by the weight of the rockers and of the pull-in roll supported therewith if said weight is sufficient for pressing the incoming strands against the other pull-in roll. In such a case, it is possible to dispense with the controllable piston-cylinder unit.

The counterforce is advantageously produced by a spring disposed adjacent to the stop, the force of said spring being overcome by the preload. When the preload disappears owing to triggering by the proximity-type switching element, the force of the spring takes effect immediately in order to lift off the displaceable pull-in roll.

A further advantageous possibility for lifting off one pull-in roll from the other pull-in roll consists in connecting the proximity-type switching element to wedged elements, said wedged elements being tapered towards the rolls for moving between the rolls or the shafts thereof when the proximity-type switching element is displaced towards the pull-in device thus raising the contact of the strand material with at least one roll. This is, therefore, an all-mechanical design in which the actuated proximity-type switching element acts directly via the wedged elements on s the rolls in the sense that said rolls are removed from each other. If the inlet shaft is designed as the proximity-type switching element, it is possible for the wedged elements to be connected directly to the inlet shaft; when the latter is displaced, e.g. by the hand of an operator, the wedged elements are then actuated directly in order to move apart the pull-in rolls.

In order to set a limit to the intervention of the wedged elements, it is advantageous to provide a stop such that, when the wedged elements engage between the rolls, the driven roll advances the wedged elements only as far as to said stop.

In order to guarantee the reliable entrainment of the wedged elements, the wedged elements are advantageously provided with a surface structure on their side pointing towards the driven roll that matches, in terms of positive or frictional engagement, the surface of the driven roll, wherein, when the stop is reached, the positive or frictional engagement between the surface structure and the relevant surface of the driven roll is cancelled.

A further advantageous design of the connection of the proximity-type switching element to the pull-in device consists in that the proximity-type switching element is in communication with levers in such a manner that one end thereof is movable towards the driven roll by the proximity-type switching element, said lever ends being turned, when contact is made with the driven roll, towards the inter-roll gap by the driven roll, the non-driven roll being lifted from the driven roll through engagement of the levers with the bearing of the non-driven roll.

As with the design of the aforementioned wedged elements, it is also possible to provide the lever ends with a surface structure that matches, in terms of positive or frictional engagement, the surface of the driven roll in such a manner that, when the lever ends engage with the driven roll, said driven roll further turns the lever ends as far as to a stop.

BRIEF DESCRIPTION OF THE DRAWINGS

Advantageous embodiments of the invention are represented in the drawings, in which.

The drawings show advantageous embodiments of the invention.

DESCRIPTION OF THE PREFERRED EMBODIMENTS

Figure 1:
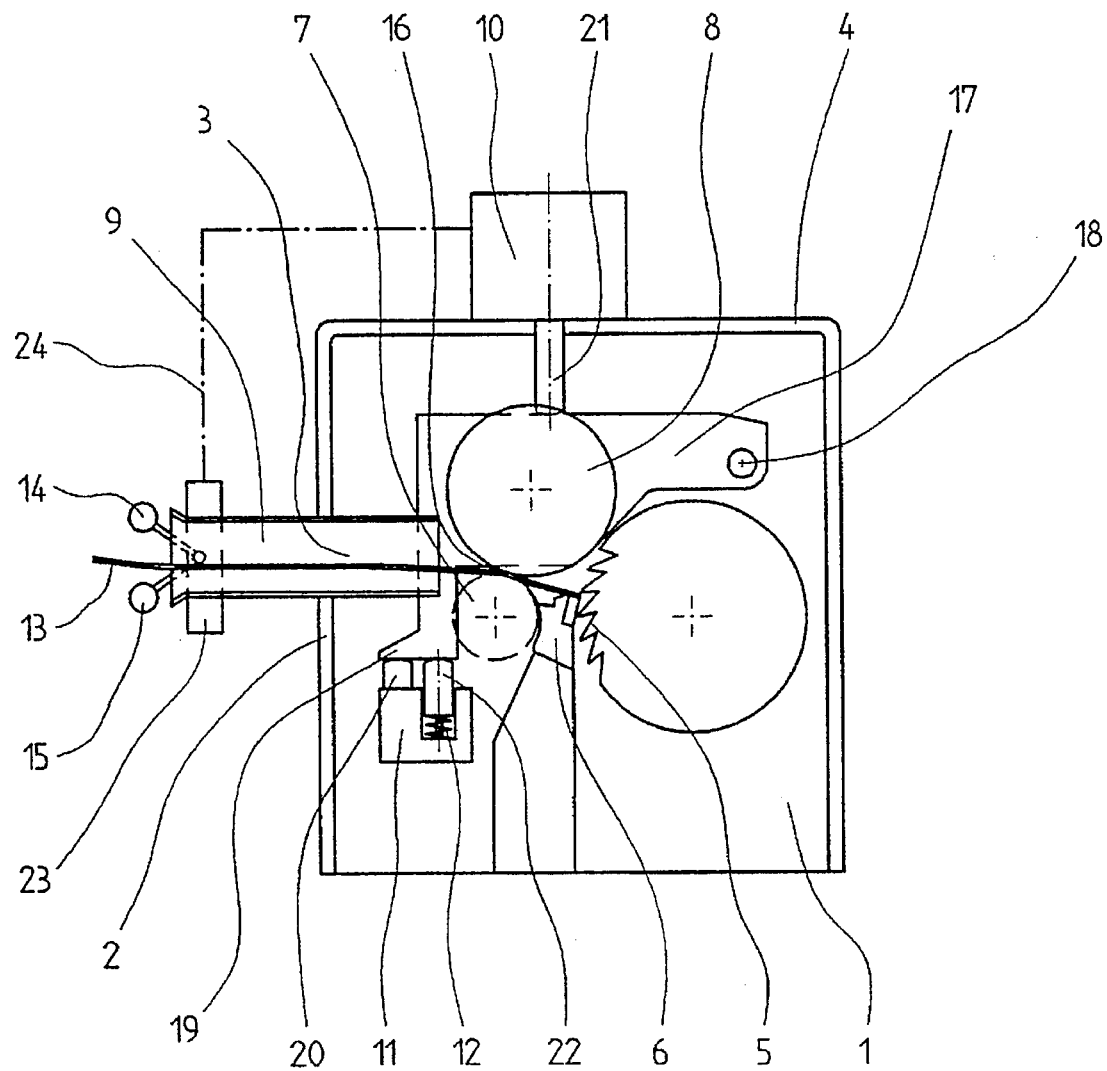
FIG. 1 shows an embodiment having a non-driven roll under a preload.

FIG. 1 shows a side view of the granulating device, the internal elements of the granulating device being visible owing to the omission of a front side wall. Shown is the rear side wall 1, on which rests the cover 4. The front side of the granulating device is closed off by the front panel 2. The front panel is punctured for forming an inlet gap 3 through which the strands 13 can be fed to the granulating device. Inserted into the inlet gap 3 and extending away from the front panel 2 is the inlet shaft 9, which conducts the strands 13. Attached to the end of the inlet shaft 9 facing away from the front panel 2 are the two proximity switches 14 and 15, which will be discussed in greater detail hereinbelow.

Provided in the interior of the granulating device is a pull-in device, which consists of the displaceable pull-in roll 8 and the counter-roll 7. Pull-in roll 8 and counter-roll 7 cramp the strands 13 supplied to them within the inter-roll gap 16 formed between said rolls. Owing to a drive mechanism, usually acting on one of the two rolls, said pull-in roll 8 and counter-roll 7 crampingly grip the strands 13 and thus feed them towards the counter-knife 6, which cooperates in known manner with the knife roll 5. The supplied strands 13 are cut up into granulate by means of the counter-knife 6 and the knife roll 5.

The knife roll 5 and the counter-roll 7 are supported in known manner on the side walls of the granulating device, of which side walls, as stated hereinbefore, only the rear side wall 1 is shown. The displaceable pull-in roll 8 is supported on its two sides on rockers, said rockers pivoting in parallel on the shaft 18 and thus permitting the parallel displacement of the pull-in roll 8 (only the rear rocker 17 is shown here). A corresponding rocker is provided on the opposite end face of the displaceable pull-in roll 8 (not shown in the drawing). The rocker 17 changes into the downward-pointing extension 19, which is seated on the stop 20. The stop 20 is attached to the rest 11, which is mounted on the rear side wall 1. A corresponding rest 11 with stop 20 is provided on the opposite side on the front side wall (not shown). Owing to this arrangement, the rocker 17 and thus the displaceable pull-in roll 8 have defined end positions, through which a correspondingly adjusted inter-roll gap 16 is determined. In order to adjust the width of the inter-roll gap 16, it is possible to provide for the displaceability of the stop 20.

The plunger 21 of the piston-cylinder unit 10 (here driven pneumatically) presses on the rocker 17. Owing to the pressure exerted on the rocker by the piston-cylinder unit 10 via the plunger 21, the rocker is preloaded into its defined position, given by the stop 20 and the extension 19. The piston-cylinder unit 10 acts like a spring, with the result that, for example, in the case of the passage of thicker strands 13, the displaceable pull-in roll 8 is able to recede against the pressure from the piston-cylinder unit 10.

The extension 19 presses on the intermediate element 22, which, in turn, presses on the spring 12, which is held in a hole in the rest 11. The spring 12 is dimensioned such that its force is overcome by the load applied by the piston-cylinder unit 10. This means that, in the operating position shown in the drawing, the extension 19 presses against the stop 20 under the action of the piston-cylinder unit 10.

The proximity switches 14 and 15 (proximity-type switching elements) are provided to ensure that an operator who is working near the side of the granulating device facing the front panel 2 is not pulled into the pull-in shaft 9, for example with the hand, owing to the passage of the strands 13. The proximity switches are, as already stated hereinbefore, attached to the end of the pull-in shaft 9 facing away from the front panel 2. They are formed by rotary levers which act on valves in the valve housing 23. If, therefore, an operator strikes one of the proximity switches 14 and 15, for example with his/her hand, and, in so doing, turns it, this causes the corresponding actuation of a valve in the valve housing 23. The valves of the valve housing 23 are connected via the control line 24 (shown by dash-dotted line) to the supply line for the pressure medium for actuating the piston-cylinder unit 10 and have the following mode of action: normally, the proximity switches 14 and 15 allow the pressure medium to enter the piston-cylinder unit 10, with the result that said piston-cylinder unit 10 is able in the hereinbefore described manner to hold the rocker 17 and thus the displaceable pull-in roll 8 under preload. Through the actuation of one of the proximity switches 14 and 15, the pressure exerted by the pressure medium, particularly air, on the piston-cylinder unit 10 is removed, with the result that the force of pressure, and thus the load, exerted by the plunger 21 is removed from the rocker 17. The consequence of this is that the force of the spring 12 now takes effect and, via the intermediate element 22, lifts the extension 19 and thus the rocker 21 from the stop 20, this resulting in the opening of the inter-roll gap 16 to such an extent that no further pulling force can be exerted on the strands 13 by the displaceable pull-in roll 8 and the counter-roll 7. The forward motion of the strands 13 is thus abruptly stopped, with the result that the strands are now unable to exert any form of pulling force, by means of friction, on any objects in front of the inlet shaft. Consequently, an operator is abruptly removed from the danger of in any way being pulled in by the otherwise still moving strands 13.

It may also be pointed out that the spring 12 may also be replaced by a further piston-cylinder unit acting in a similar manner as the spring 12. Such a further piston-cylinder unit would, in this case, have to be activated immediately by the proximity switches 14 and 15 when the piston-cylinder unit 10 is deactivated, in order to cause the hereinbefore described lifting-off of the displaceable pull-in roll 8.

Figure 2:
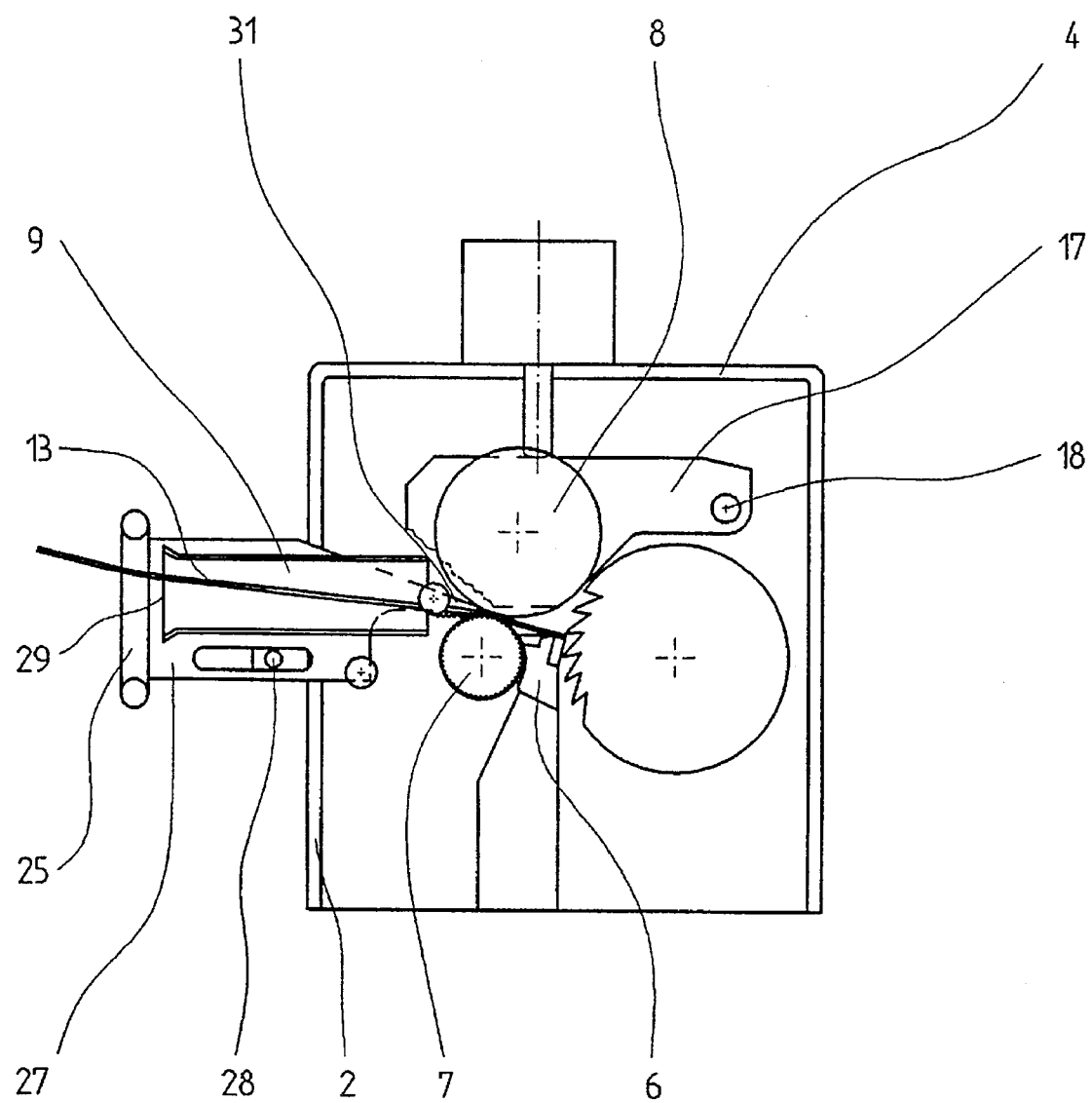
FIG. 2 shows an embodiment having wedged elements.

FIG. 2 shows a side view of a granulating device in which, for the granulating process, the same components are provided as in the embodiment according to FIG. 1, with the result that reference may be made in this regard to the explanations in respect of FIG. 1. The design according to FIG. 2 differs from the embodiment in FIG. 1 in the method by which the inter-roll gap 16 is increased.

The proximity-type switching element serving to protect an operator consists in this case of a displaceable frame 25, which essentially embraces the entrance to the inlet shaft 9. Attached to the frame 25 are two wedged elements 26/27 (see FIG. 2, the mode of operation of which is explained in greater detail hereinbelow in conjunction with FIGS. 4-6). FIG. 2 shows only the wedged element 27, since FIG. 2 is a section more or less through the centre of the granulating device shown. The wedged elements 26/27 are attached to the front panel 2 of the granulating device and are displaceable with respect to the granulating device via oblong-hole bearings 28. It becomes apparent from the top view shown in FIG. 3 of the granulating device according to FIG. 2 how the two wedged elements 26 and 27 project over the counter-roll 7 (lower pull-in roll). They are in an operating position as shown in FIG. 5. The two wedged elements 26 and 27 extend laterally past the inlet shaft 9. Disposed in front of the entrance 29 to the inlet shaft 9 is the frame 25, which embraces the entrance 29 and to which are attached the two wedged elements 26 and 27. When the hand of an operator strikes the frame 25, the frame 25 is displaced towards the entrance 29 of the inlet shaft 9, with the result that, as explained in greater detail hereinbelow, the expansion parts 30/31 of the wedged elements 26/27 are slid between the two rolls 7 and 8.

Figure 3:
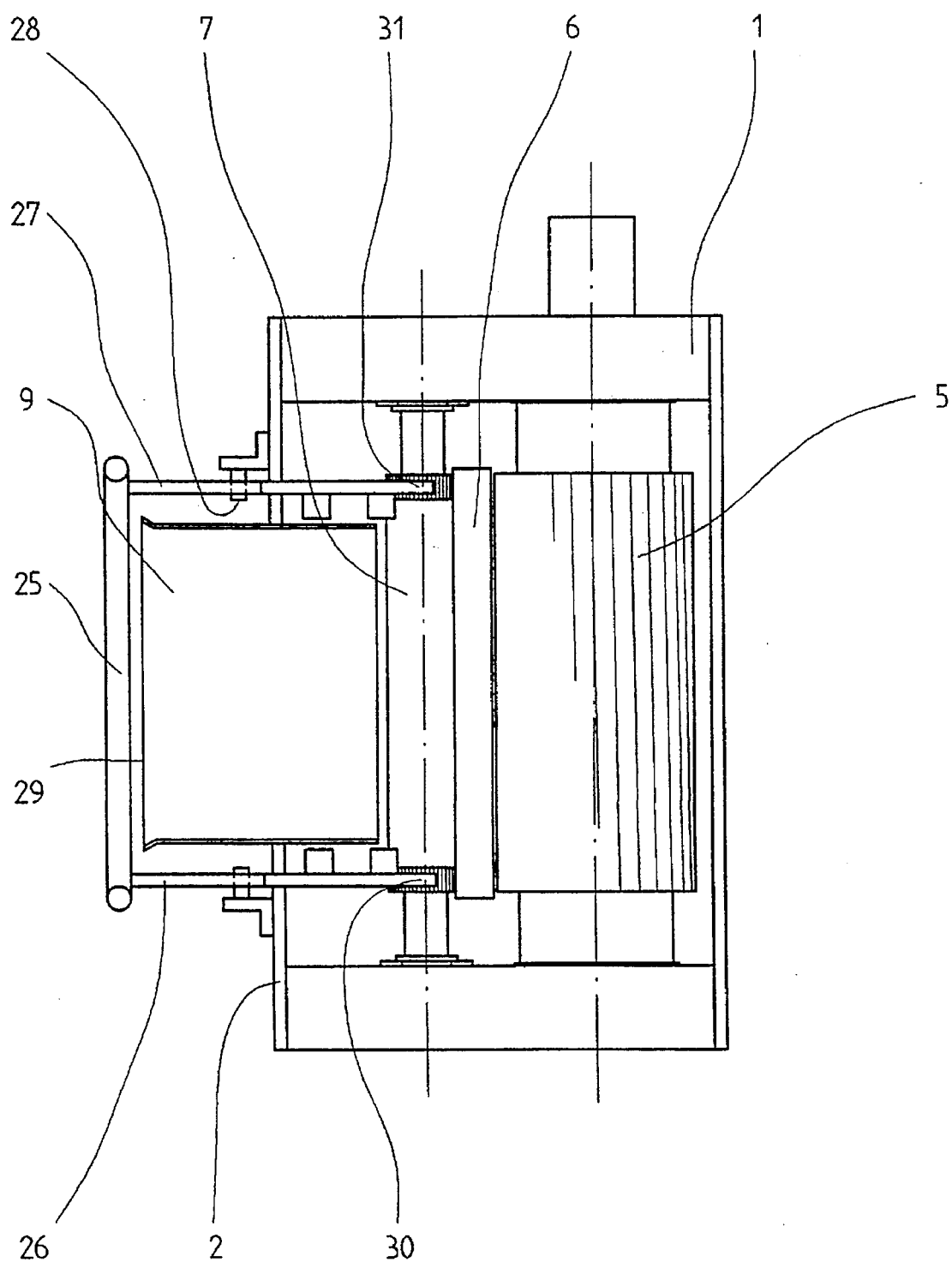
FIG. 3 shows a top view of the arrangement according to FIG. 2.

The further components of the granulating device shown in FIG. 3 are identical to those components according to FIG. 2 that have been provided with the same reference numerals. For reasons of clarity of representation, the pull-in roll 8, the cover 4 and the rockers 17 have been omitted in FIG. 3.

Figure 4:
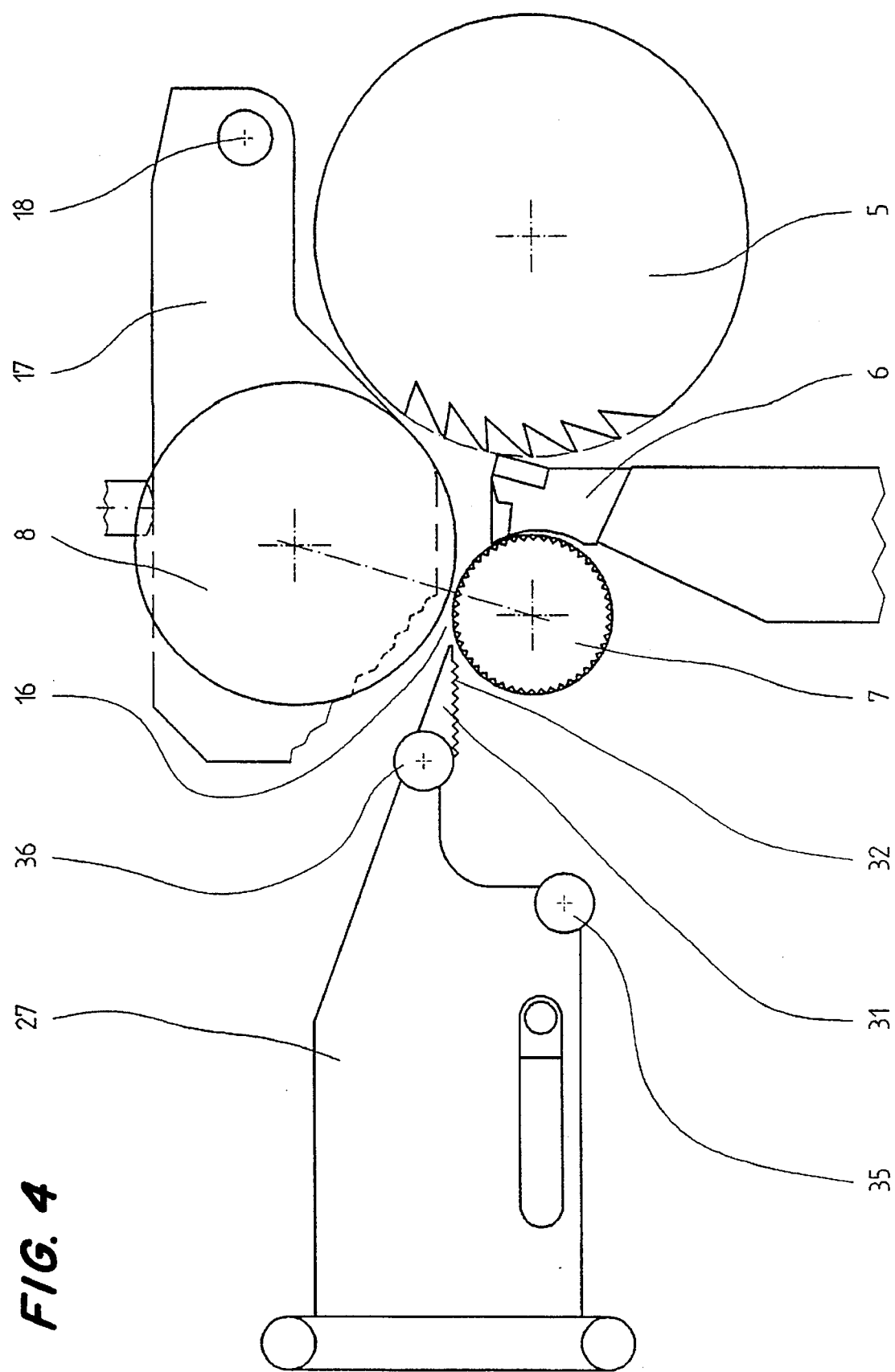
FIGS. 4–6 show three phases of the pulling-in of the wedged elements into the pull-in device.
Figure 5:
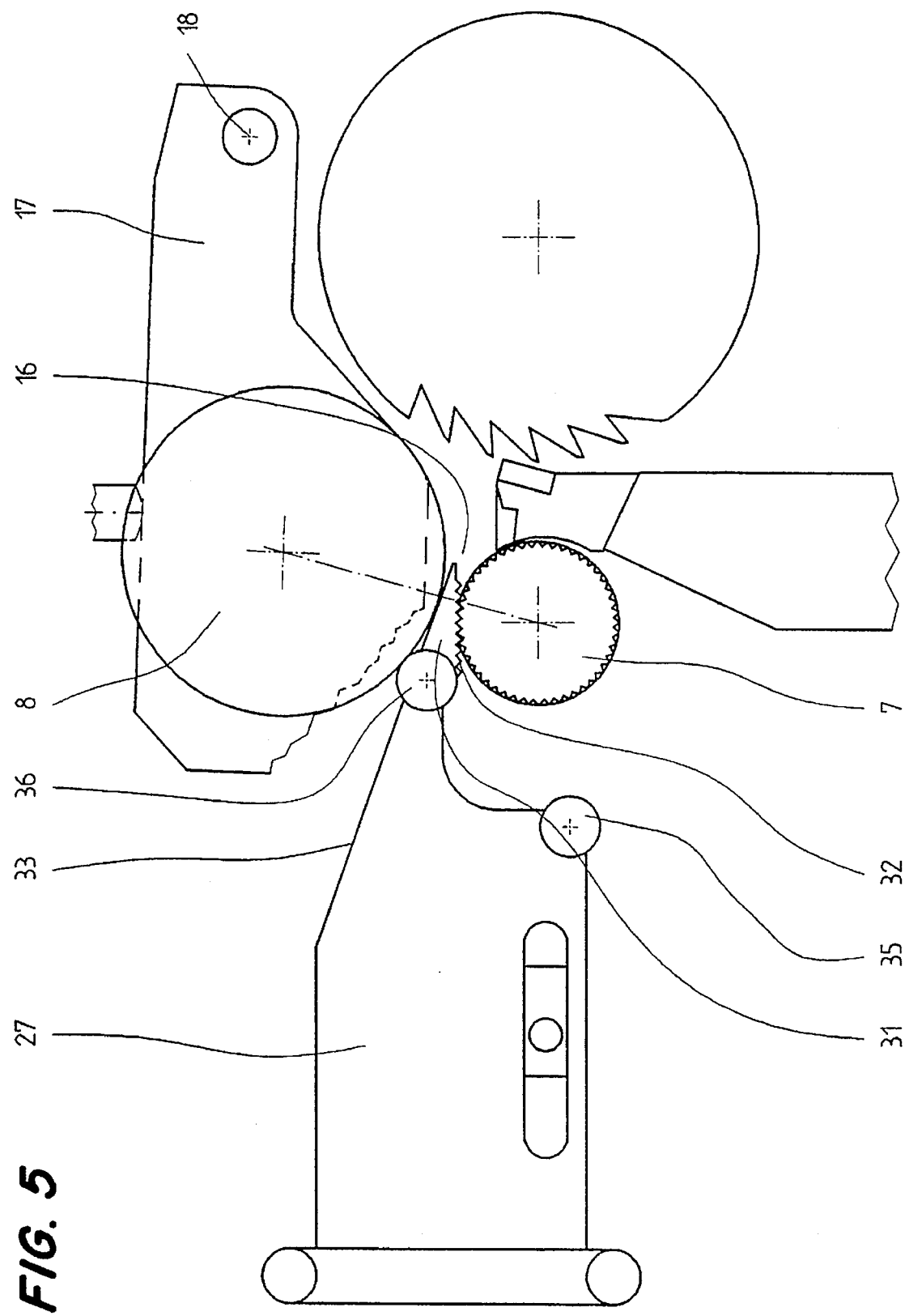
Figure 6:
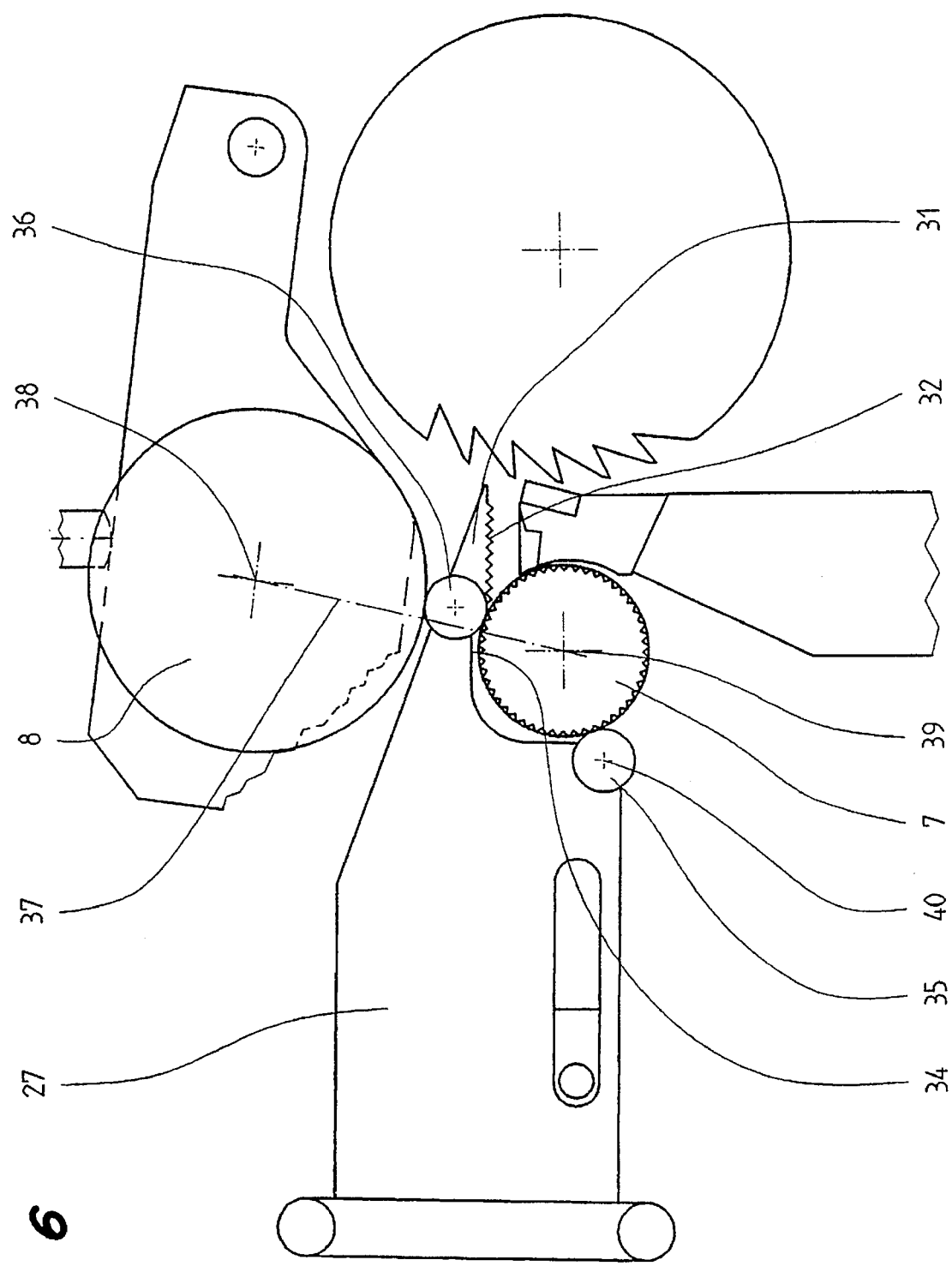

FIGS. 4-6 show 3 operating phases of the principle of operation of the wedged elements 26/27 (only the wedged element 27 is identified, because FIGS. 4-6 show the components of relevance in this connection similarly to the section shown in FIG. 2).

FIG. 4 shows the operating phase of unhindered entry of the strands 13, which, in FIGS. 4-6, have been omitted for reasons of clarity of representation (see, however, FIG. 2). In the operating phase according to FIG. 4, the expansion part 31 is at a certain distance from the inter-roll gap 16, with the result that the expansion part 31 is unable to exert any influence on the rolls 7 and 8. Strands 13 pulled in by the rolls 7 and 8 (see FIG. 2) can, therefore, be drawn in without hindrance by the pull-in rolls 7 and 8 and be fed to the knife roll 5.

If the frame 25 is displaced (see FIG. 2) towards the granulating device, for example by the hand of an operator, the expansion part 31 is inserted into the inter-roll gap 16 and, under the action of the lower pull-in roll 7, is pushed further into the inter-roll gap 16. For this purpose, the expansion part 31 is provided on its side facing the lower pull-in roll 7 with a surface structure that is adapted to that of the lower pull-in roll 7. In order to make good pull-in contact with the strands 13 (see FIG. 2), the lower pull-in roll 7 is provided with a knurled surface, which is represented in FIGS. 4-6 as a form of gear-tooth surface. The expansion part 31 has a corresponding knurled surface 32 in the form of a gear-tooth surface, with the result that, once the knurled surface of the lower pull-in roll 7 has been engaged by the knurled surface 32, the expansion part 31 is pulled in between the two rolls 7 and 8. Owing to the wedge-shaped form of the expansion parts 30/31, the upper pull-in roll is lifted by the smooth rear side 33 of the expansion part 31 and of the wedged element 27, the rockers 17 correspondingly pivoting about their shaft 18. Consequently, the inter-roll gap 16 is widened after only minor entry of the expansion part 31, with the result that no further pulling force can be exerted on the strands 13 between the pull-in rolls 7 and 8, with the result that, owing to their low inertia, said strands 13 virtually immediately come to a stop.

The pull-in motion of the expansion part 31 is continued until the entire region of the knurled surface 32 has been passed over, this being shown in FIG. 6. At the end of the knurled surface 32 (towards the frame 25), the knurled surface changes into a smooth front side 34, as a result of which the knurled surface of the lower pull-in roll 7 is virtually unable to exert any further considerable friction on the wedged element 27.

In order, during this motion of the wedged elements 26/27, to ensure, on the one hand, that the end position shown in FIG. 6 is reached and, on the other hand, that said end position cannot be overrun, the rollers 35 and 36 are provided on the wedged elements 26/27, to be more specific, on each of the two wedged elements 26 and 27. The roller 36 is attached to the wedged element 27 in the region of the expansion part 31 and is of such a diameter that, in the position shown in FIG. 6, it lies just behind the connecting line 37 between the axes 38 and 39 of the pull-in rolls 7 and 8 when the wedged elements 26/27 have reached their end positions. The roller is held in this position by the pressure exerted on it by the upper pull-in roll 8, since, when the wedged elements 26/27 are returned, it must lift the upper pull-in roll 8. The end position of the wedged elements 26/27 shown in FIG. 6 is defined by the further roller 35, which, in the end position shown, is up against the lower pull-in roll 7. The roller 35 can be entrained by the still rotating lower pull-in roll 7, since it is rotatably held on the axis 40.

Figure 7:
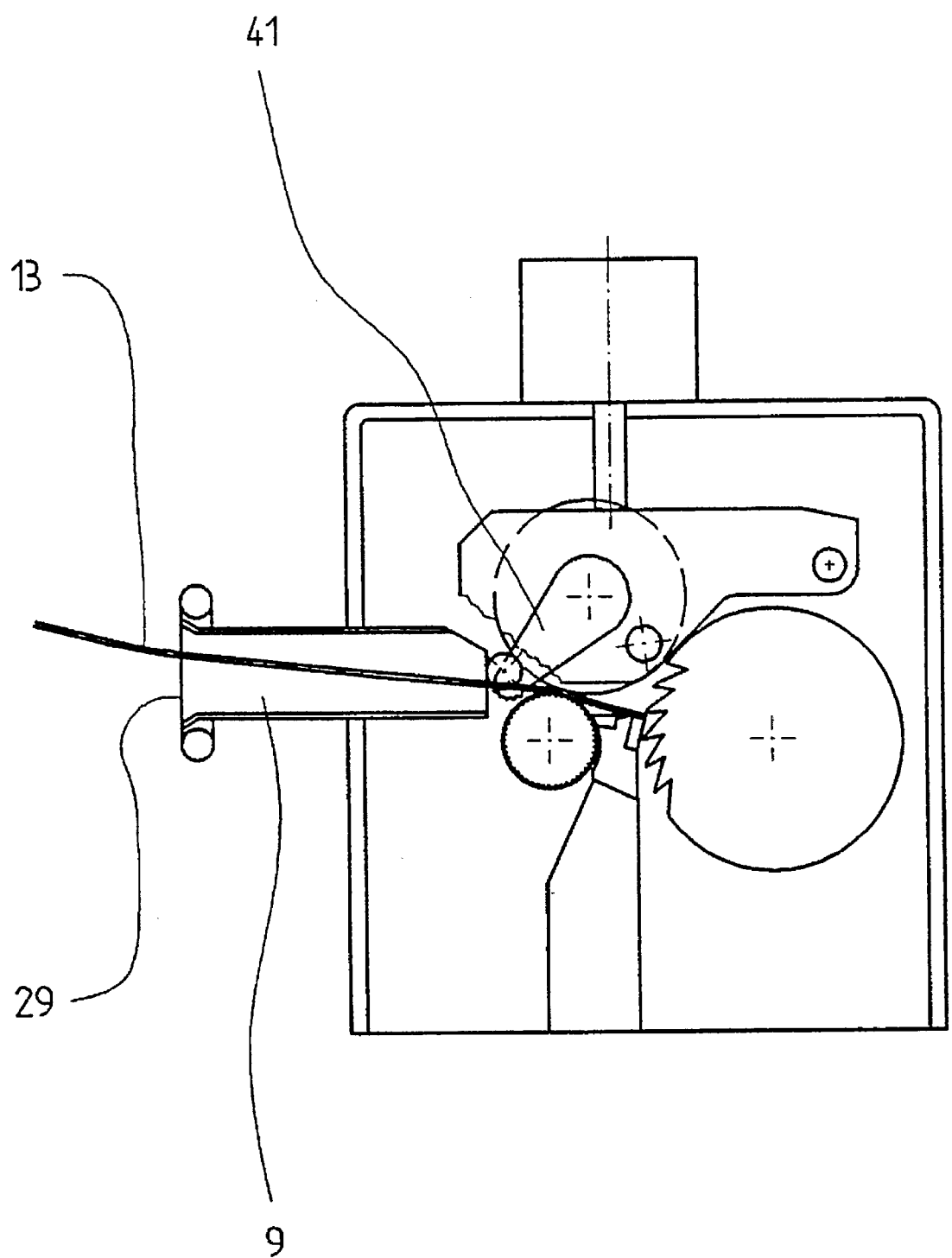
FIG. 7 shows an embodiment having levers for lifting the non-driven roll from the driven roll.

FIG. 7 shows a further variant with regard to the method of increasing the inter-roll gap. Provided for this purpose in the granulating device s according to FIG. 7 are levers 41, which, similarly to the wedged elements 26/27 according to FIG. 3, are disposed in the region of the two sides of the pull-in device. For reasons of clarity of representation, only the lever 41 is shown in FIG. 7, since FIG. 7 is a section through the granulating device similar to that in FIG. 1 and 2. With regard to the components that are provided with identical reference numerals in FIG. 7 and 1, reference is made to the relevant description in respect of FIG. 1.

Figure 8:
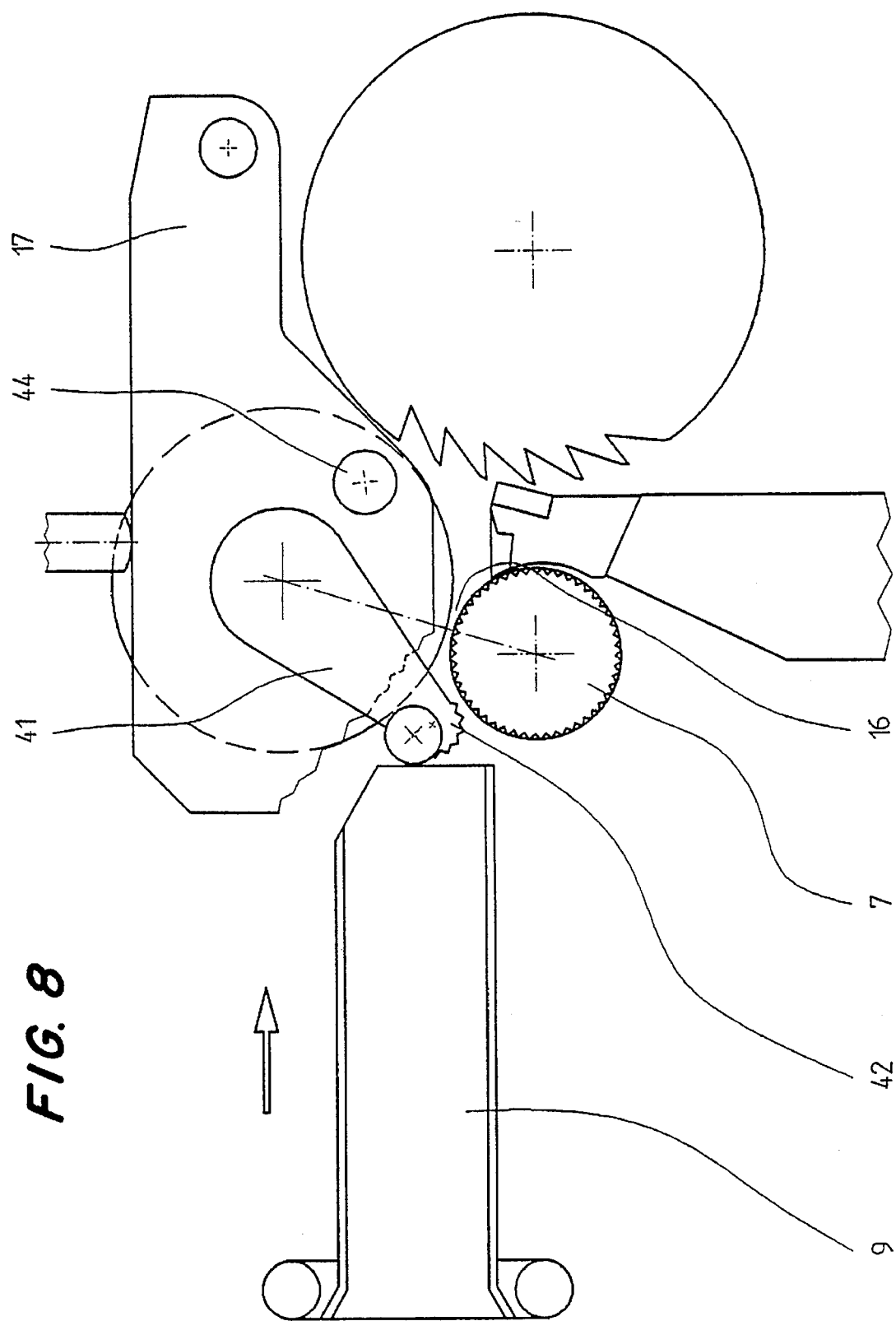
FIGS. 8–10 show three phases of the turning movement of the levers.
Figure 9:
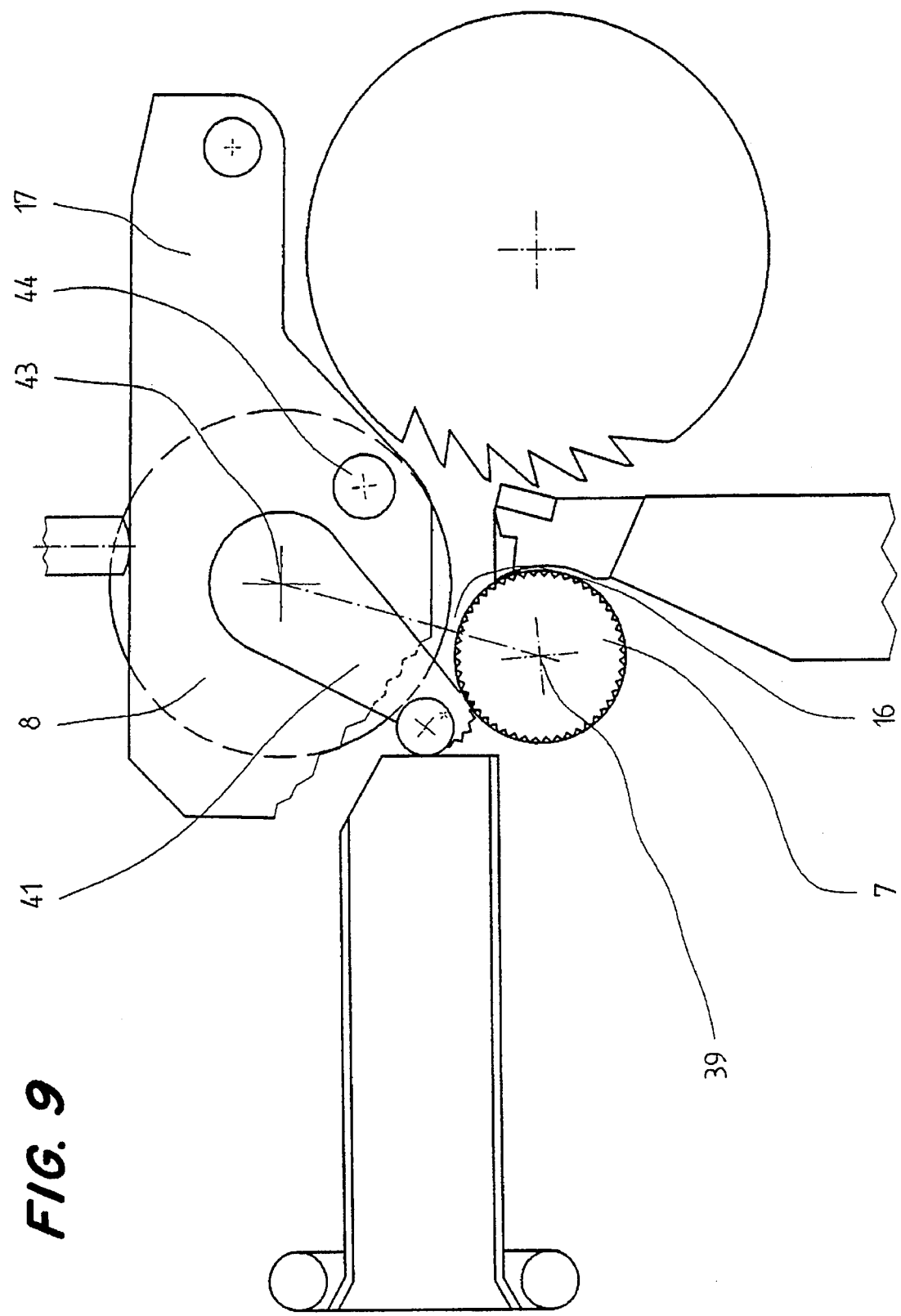
Figure 10:
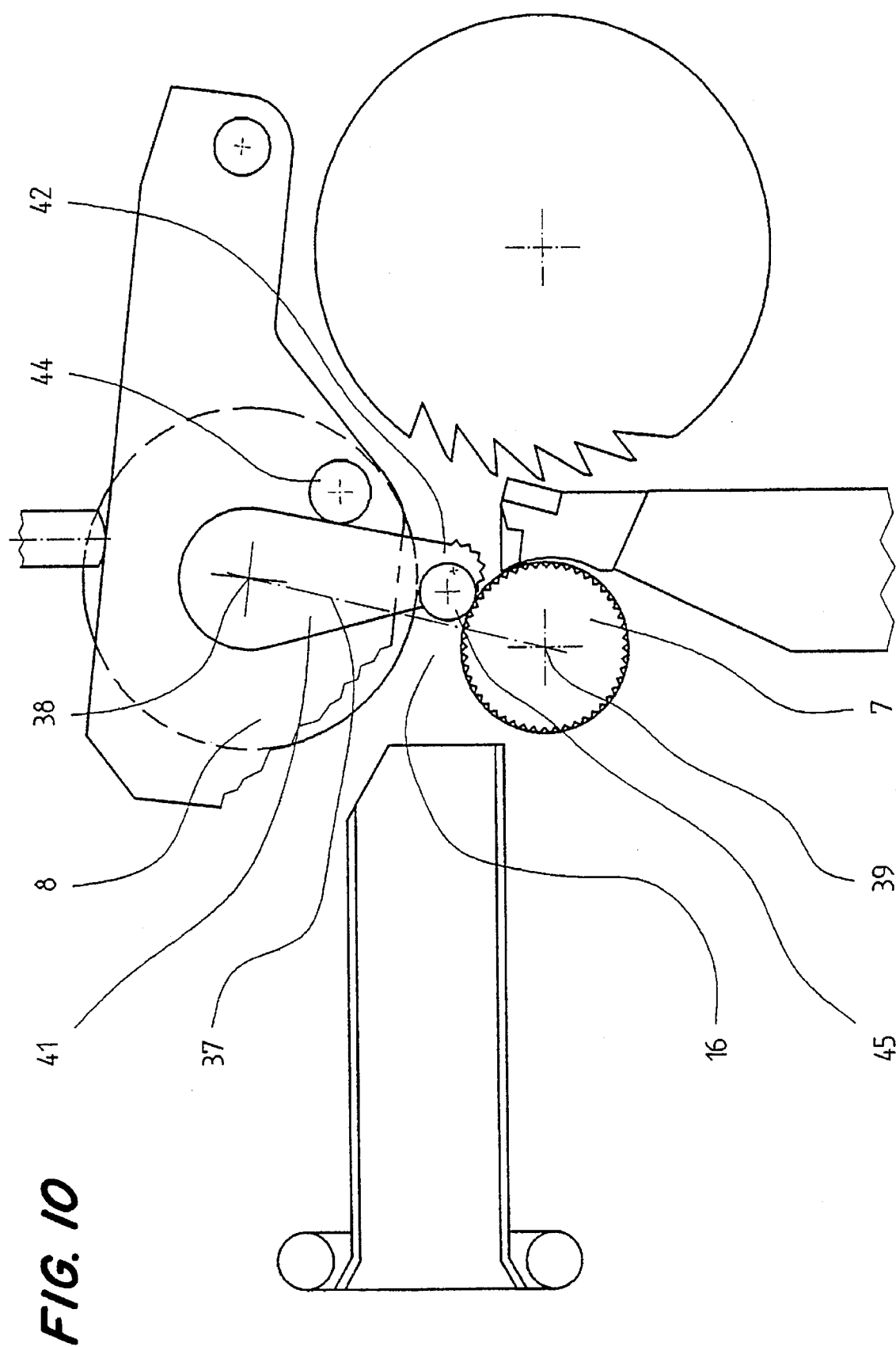

For explanation of the actuation of the levers 41, reference may be made to FIGS. 8, 9 and 10, which show three working phases of the levers.

According to FIG. 8, the levers 41 are in their rest position, in which they maintain a distance from the lower pull-in roll 7, which, like the pull-in roll according to FIGS. 2 to 6, is knurled. The lever 41 is in communication with the here displaceably held inlet shaft 9, of which only that part that projects into the granulating device is shown in FIGS. 8 to 10. The inlet shaft 9 can be displaced from outside to inside into the housing of the granulating device (see arrow in drawing), e.g. through a manual operation in front of the entrance 29 to the inlet shaft 9. In the case of such a displacement, the end 42 of the lever 41 facing the lower pull-in roll 7 is displaced towards the lower pull-in roll 7 until the end 42, likewise knurled, comes into engagement with the lower pull-in roll 7.

This engagement position is shown in FIG. 9. In order to reach this position, the lever 41 has been rotated about its axis 43, which, in this case, coincides with the axis of the upper pull-in roll 8. It should, however, be pointed out that the axis for the levers 41 may also be positioned elsewhere, it merely being necessary to satisfy the condition that, as further explained hereinbelow, the levers 41 can, through engagement with the lower pull-in roll 7, be rotated by said pull-in roll 7 in such a manner that they lever up the upper pull-in roll 8 from the lower pull-in roll 7. It must, therefore, be guaranteed that the levers 41 are in communication in this respect with the axis (shaft) of the upper pull-in roll 8 or of the rocker 17.

Owing to the engagement of the end 42 of the lever 41 with the lower pull-in roll 7 as shown in FIG. 9, said end is entrained in the direction of the arrow by the lower pull-in roll 7 on account of the rotation thereof, the axis 43 moving away from the axis 39 of the lower pull-in roll 7. As a result of this, there is also an increase in the inter-roll gap 16, with the consequence that the impact of the end 42 on the lower pull-in roll 7 abruptly increases said inter-roll gap 16, the feeding-in of the strands 13 thereby being abruptly terminated.

The rotation of the lever 41 is then continued, with further displacement of its end 42, as far as to the position shown in FIG. 10, in which the lever 41 comes up against the stop 44, where it is stopped. In this position, the end 42 of the lever 41 is lifted off from the surface of the lower pull-in roll 7, with the result that said lower pull-in roll 7 is unable to exert any further friction on the end 42. In this position, moreover, the rotatably held roller 45, disposed in the region of the end 42, comes between the lower pull-in roll 7 and the upper pull-in roll 8, such that it comes to lie behind the connecting line 37 between the axes 38 and 39. The roller 45 is held in this position, similarly to the roller 36 according to FIG. 6. It is ensured in this manner that, once the lever 41 has been rotated into its end position, that position is maintained, unless another form of intervention in the machine is effected.

In the aforedescribed arrangement, therefore, a displacement of the inlet shaft 9, caused, for example, by the hand of an operator, directly activates the mechanism for increasing the inter-roll gap 16, with the consequence that the further pulling-in of the strands 13 is then abruptly stopped.

If the one pull-in roll has been lifted from the other pull-in roll, as has been described in conjunction with the aforementioned embodiments, then the continuous operation of the granulating device is in any event interrupted, because the pulling-in of the strands has been stopped. Owing to this interruption in operation, attributable usually to a hazardous situation, it is then necessary in any case to re-start the granulation process. The granulating device can then be opened in conventional manner, such as when it is being cleaned, the individual component parts of the granulating device then returning to their normal positions; that is, the two pull-in rolls 7 and 8 approach each other again in order to form the pulling-in gap, the rockers 17 and the wedged elements 26/27 and the levers 41 then returning to their respective starting positions.

What is claimed is:

1. A granulating device for strand materials (13) comprising a pull-in device for feeding said strand material (13) conducted through an inlet shaft (9) and transporting it to a knife roll (5) for cutting up said strand material (13) into granulate, said pull-in device having a pull-in roll (8) and a counter-roll (7), of which rolls (8, 7) at least one is driveable and both form an inter-roll gap (16) for pulling in said strand material (13), characterized in that a proximity-type switching element actuatable in response to approach of a human body part (14, 15; 25) is disposed in the region of the inlet shaft, particularly in front of the entrance (29) thereof, said proximity-type switching element (14, 15; 25) being operable to cancel, when actuated, the setting of the inter-roll gap (16) and increase the inner-roll gap (16) to such a width that the further pulling-in of said strand material (13) is abruptly stopped.

2. The granulating device according to claim 1, characterized in that said proximity-type switching element (14, 15; 25) is in communication with said inlet shaft (9), said inlet shaft (9) determining a safety clearance between the pull-in device (7, 8) and said proximity-type switching element (14, 15; 25).

3. The granulating device according to claim 2, characterized in that said inlet shaft (9) forms said proximity-type switching element.

4. The granulating device according to claim 2, characterized in that said proximity-type switching element is in the form of a frame (25), said frame (25) essentially embracing said entrance (29) to said inlet shaft (9) and being displaceable in the direction of said shaft.

5. A granulating device having a displaceable pull-in roll (8), said pull-in roll (8) being supported by displacement bearings (17) which permit the parallel displacement of said pull-in roll (8), according to any one of claims 1–4, characterized in that said displacement bearings (17) are pressed by a preload against a stop (20), said preload being triggerable by said proximity-type switching element (14, 15) in such a manner that, when said proximity-type switching element (14, 15) is actuated, said preload is removed and a counterforce takes effect, said counterforce lifting said displacement bearings (17) from the stop (20) and thus the displaceable pull-in roll (8) from the counter-roll (7).

6. The granulating device according to claim 5, characterized in that said displacement bearings are in the form of rockers (17), a piston-cylinder unit (10) controllable by said proximity-type switching element (14, 15) acting on each of said rockers (17).

7. The granulating device according to claim 5, characterized in that the counterforce is produced by a spring (12) disposed adjacent to said stop (20), the force of said spring (12) being overcome by the preload.

8. The granulating device according to any one of claims 1–4, characterized in that said proximity-type switching element is connected to wedged elements (26, 27), said wedged elements (26, 27) being tapered towards said rolls (7, 8) and, when said proximity-type switching element (25) is displaced towards the pull-in device, being operable to move between said rolls (7, 8) thereof and raise the contact of said strand material (13) with at least one roll (7, 8).

9. The granulating device according to claim 8, characterized in that, when said wedged elements (26, 27) engage with said rolls (7, 8), said driven roll (7) advances said wedged elements (26, 27) as far as to a stop (35).

10. The granulating device according to claim 9, characterized in that said wedged elements (26, 27) are provided, on their side pointing towards said driven roll (7), with a surface structure (32) that matches, in terms of positive or frictional engagement, the surface of said driven roll (7), and in that, when said stop (35) is reached, the positive or frictional engagement between said surface structure (32) and the relevant surface of said driven roll (7) is cancelled.

11. The granulating device according to claim 1, characterized in that said proximity-type switching element (9) is in communication with levers (41) in such a manner that one end (42) thereof is movable by said proximity-type switching element (9) towards said driven roll (7), said lever ends (42) being operable to be turned, when contact is made with said driven roll (7), towards the inter-roll gap (16) by said driven roll (7), said non-driven roll (8) being operable to be lifted from said driven roll (7) through engagement of the levers (41) with the bearing of the non-driven roll (8).

12. The granulating device according to claim 11, characterized in that said lever ends (42) are provided with a surface structure that matches, in terms of frictional engagement, the surface of said driven roll (7) in such a manner that, when said lever ends (42) engage with said driven roll (7), said driven roll is operable (7) to further turn said lever ends (42) as far as to a stop (44).

* * * * *